(12) United States Patent
Son

(10) Patent No.: US 8,846,272 B2
(45) Date of Patent: Sep. 30, 2014

(54) ANODE FOR FUEL CELL, MEMBRANE-ELECTRODE ASSEMBLY FOR FUEL CELL INCLUDING SAME, AND FUEL CELL SYSTEM INCLUDING SAME

(75) Inventor: In-Hyuk Son, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1222 days.

(21) Appl. No.: 11/942,692

(22) Filed: Nov. 19, 2007

(65) Prior Publication Data
US 2008/0248373 A1    Oct. 9, 2008

(30) Foreign Application Priority Data

Nov. 20, 2006  (KR) .......................... 10-2006-0114606
Nov. 15, 2007  (KR) .......................... 10-2007-0116603

(51) Int. Cl.
*H01M 4/02* (2006.01)
*H01M 4/36* (2006.01)
*H01M 4/90* (2006.01)

(52) U.S. Cl.
USPC ............................ 429/524; 429/523; 429/528

(58) Field of Classification Search
CPC .................................................. H01M 8/1002
USPC .................................................. 429/532, 533
See application file for complete search history.

(56) References Cited

U.S. PATENT DOCUMENTS

2004/0115515 A1*  6/2004  Ueda et al. ...................... 429/40

FOREIGN PATENT DOCUMENTS

| JP | 2000-149959 | 5/2000 |
|---|---|---|
| JP | 2003-265956 | 9/2003 |
| KR | 10-2005-0046102 | 5/2005 |
| KR | 10-2007-0000253 | 1/2007 |

OTHER PUBLICATIONS

KIPO Office action dated May 17, 2010, for priority Korean Patent application 10-2007-0116603.
Notice of Allowance dated Jul. 30, 2010, issued by the Korean Patent Office for corresponding Korean Patent Application No. 10-2007-0116603.

* cited by examiner

*Primary Examiner* — Barbara Gilliam
*Assistant Examiner* — Steven Scully
(74) *Attorney, Agent, or Firm* — Christie, Parker & Hale, LLP

(57) ABSTRACT

Anodes for fuel cells, membrane-electrode assemblies for fuel cells including the anodes, and fuel cell systems including the membrane-electrode assemblies are provided. The anode includes a catalyst layer including a platinum-based metal catalyst and a carbon monoxide oxidizing catalyst on a catalyst support, and an electrode substrate. The catalyst support may be selected from $ThO_2$, $CeO_2$, $Ce_2O_3$, $Mn_xO_y$ (where x ranges from 1 to 2 and y ranges from 1 to 3), $Co_3O_4$, $ZrO_2$, $TiO_2$, and combinations thereof. The anode for a fuel cell includes a carbon monoxide oxidizing catalyst, which increases carbon monoxide oxidation, thereby providing high activity.

19 Claims, 1 Drawing Sheet

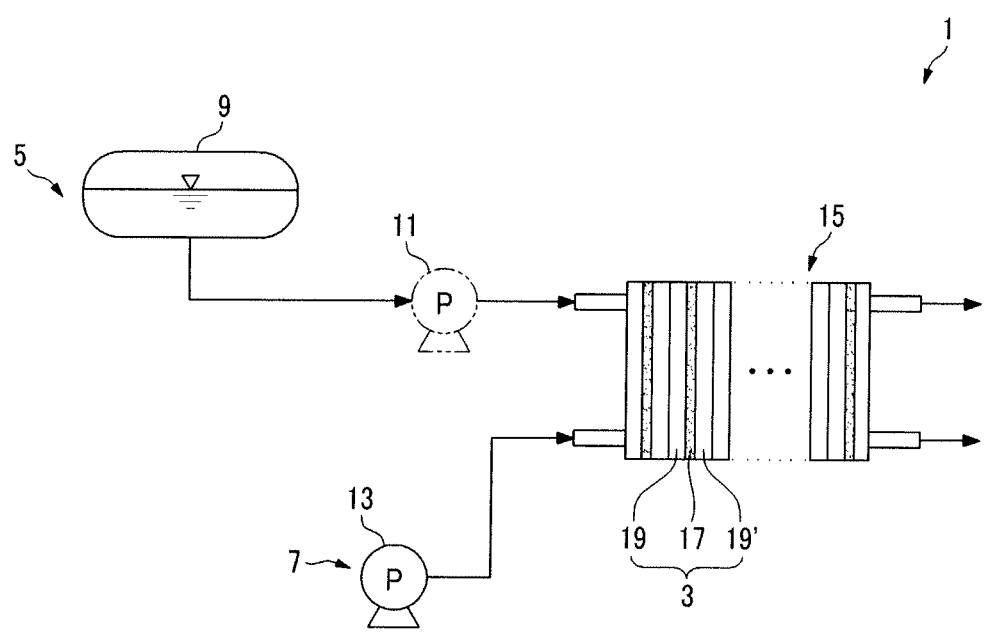

ANODE FOR FUEL CELL, MEMBRANE-ELECTRODE ASSEMBLY FOR FUEL CELL INCLUDING SAME, AND FUEL CELL SYSTEM INCLUDING SAME

CROSS-REFERENCES TO RELATED APPLICATIONS

This application claims priority to and the benefit of Korean Patent Application No. 10-2006-0114606 filed in the Korean Intellectual Property Office on Nov. 20, 2006, and No. 10-2007-0116603 filed in the Korean Intellectual Property Office on Nov. 15, 2007, the entire contents of which are incorporated herein by reference.

BACKGROUND OF THE INVENTION

1. Field of the Invention

The present invention relates to anodes for fuel cells, and to membrane-electrode assemblies and fuel cell systems including the same.

2. Description of the Related Art

Fuel cells are power generation systems that produce electrical energy through electrochemical redox reactions of oxidants and fuels (such as hydrogen or hydrocarbon-based materials such as methanol, ethanol, natural gas, or the like). Fuel cells are clean energy sources that may replace fossil fuels. A typical fuel cell includes a stack composed of unit cells, and produces varying ranges of power output. Since fuel cells have four to ten times higher energy density than small lithium batteries, they have been highlighted as small, portable power sources.

Some exemplary fuel cells include polymer electrolyte membrane fuel cells (PEMFCs) and direct oxidation fuel cells (DOFCs). DOFCs include direct methanol fuel cells which use methanol as the fuel. PEMFCs have high energy density and high power, but use hydrogen gas which must be carefully handled and requires use of accessory facilities such as fuel reforming processors for reforming methane or methanol, natural gas, or the like to produce hydrogen gas as the fuel. On the contrary, DOFCs have lower energy density than PEMFCs but the liquid fuel is easy to handle, the fuel cell may be operated at low temperatures, and there is no need for additional fuel reforming processors. Therefore, DOFCs have been acknowledged as appropriate systems for portable power sources for small and common electrical equipment.

In the above-mentioned fuel cell systems, the stack that generates electricity includes several to scores of unit cells stacked in multiple layers, and each unit cell includes a membrane-electrode assembly (MEA) and a separator (also referred to as a bipolar plate). The MEA includes an anode (also referred to as a "fuel electrode" or an "oxidation electrode") and a cathode (also referred to as an "air electrode" or a "reduction electrode") that are separated by a polymer electrolyte membrane. A fuel is supplied to the anode and absorbed by catalysts on the anode. The fuel is oxidized to produce protons and electrons. The electrons are transferred into the cathode via an external circuit, and the protons are transferred into the cathode through the polymer electrolyte membrane. In addition, an oxidant is supplied to the cathode, and the oxidant, protons, and electrons react on catalysts on the cathode to produce electricity along with water.

SUMMARY OF THE INVENTION

According to one embodiment of the present invention, an anode for a fuel cell has high fuel oxidation activity and carbon monoxide oxidation activity.

In another embodiment of the present invention, a membrane-electrode assembly includes the anode.

In yet another embodiment of the present invention, a high power fuel cell system includes the membrane-electrode assembly.

According to one embodiment of the present invention, an anode for a fuel cell includes an anode catalyst layer including a platinum-based metal catalyst and a carbon monoxide oxidizing catalyst on a catalyst support, and an electrode substrate supporting the anode catalyst layer. The catalyst support includes a material selected from $ThO_2$, $CeO_2$, $Ce_2O_3$, $Mn_xO_y$, where x ranges from 1 to 2 and y ranges from 1 to 3, $Co_3O_4$, $ZrO_2$, $TiO_2$, and combinations thereof.

According to another embodiment of the present invention, a membrane-electrode assembly includes a cathode and an anode facing each other, and a polymer electrolyte membrane between the cathode and anode. The anode has the above structure.

According to yet another embodiment of the present invention, a fuel cell system includes an electricity generator including a membrane-electrode assembly including the above anode and a separator positioned at each side of the membrane-electrode assembly, a fuel supplier that supplies the electricity generator with a fuel, and an oxidant supplier that supplies the electricity generator with an oxidant.

BRIEF DESCRIPTION OF THE DRAWING

The above and other features and advantages of the present invention will be better understood by reference to the following detailed description when considered in conjunction with the attached drawing, in which:

FIG. 1 is a schematic diagram of the structure of a fuel cell system according to one embodiment of the present invention.

DETAILED DESCRIPTION OF THE INVENTION

The anode for a fuel cell according to one embodiment promotes the oxidation reaction of carbon monoxide (CO), which is generated during the oxidation reaction of a fuel, particularly the oxidation reaction of a hydrocarbon fuel such as methanol.

The anode according to one embodiment of the present invention includes an anode catalyst layer and an electrode substrate supporting the anode catalyst layer.

The anode catalyst layer includes a platinum-based catalyst and a carbon monoxide oxidizing catalyst on a catalyst support. The catalyst support for the carbon monoxide oxidizing catalyst includes a material selected from $ThO_2$, $CeO_2$, $Ce_2O_3$, $Mn_xO_y$, where x ranges from 1 to 2 and y ranges from 1 to 3, $Co_3O_4$, $ZrO_2$, $TiO_2$, and combinations thereof.

The carbon monoxide oxidizing catalyst includes a metal selected from Au, Pt—Co alloys, and combinations thereof. According to one embodiment, the carbon monoxide oxidizing catalyst is Au. When a Pt—Co alloy catalyst is used, the ratio of Pt to Co is not limited. However, according to one embodiment, the ratio of Pt to Co ranges from about 50:50 to about 95:5 wt %.

The carbon monoxide oxidizing catalyst is supported on a catalyst support, and the catalyst has an average particle diameter ranging from about 20 to about 500 nm. The metal of the carbon monoxide oxidizing catalyst has an average particle diameter ranging from about 1 to about 50 nm. The carbon monoxide oxidizing catalyst includes a metal catalyst supported on a catalyst support, where the amount of the metal catalyst ranges from about 0.1 to about 10 wt %. In one embodiment, for example, the amount of the metal catalyst ranges from about 0.5 to about 5 wt %. If the average particle diameters of the carbon monoxide oxidizing catalyst and the metal catalyst, or the amount of the metal catalyst are outside these ranges, the intended purpose of the present invention is difficult to realize.

The platinum-based catalyst and carbon monoxide oxidizing catalyst may be mixed in a ratio ranging from about 95 to 99.9:5 to 0.1 wt %. According to one embodiment, the platinum-based catalyst and carbon monoxide oxidizing catalyst may be mixed in a ratio ranging from about 99 to 99.9:1 to 0.1 wt %. When the amount of the carbon monoxide oxidizing catalyst is less than about 0.1 wt %, the beneficial effects of combining the carbon monoxide oxidizing catalyst and platinum-based catalyst are negligible. When the amount of the carbon monoxide oxidizing catalyst is greater than about 5 wt %, electrochemical conductivity decreases and power may deteriorate.

The platinum-based catalyst may be any catalyst that may perform a fuel cell reaction. The platinum-based catalyst is selected from platinum, ruthenium, osmium, platinum-ruthenium alloys, platinum-osmium alloys, platinum-palladium alloys, platinum-M alloys, and combinations thereof. M is a transition element selected from Ga, Ti, V, Cr, Mn, Fe, Co, Ni, Cu, Zn, Sn, Mo, W, Rh, Ru, and combinations thereof. According to one embodiment, the platinum-based catalyst is a platinum-ruthenium alloy.

The platinum-based catalyst may be used by itself (black catalyst), or may be supported on a catalyst support. The catalyst support may include carbon-based materials such as graphite, denka black, ketjen black, acetylene black, carbon nanotubes, carbon nanofiber, carbon nanowire, carbon nanoballs, and activated carbon, or an inorganic particulate such as alumina, silica, zirconia, and titania. In one embodiment, for example, carbon-based materials may be used. When the catalyst includes a noble metal supported on a catalyst support, it may include any commercially available catalyst or may be prepared by supporting a noble metal on a catalyst support. The process for supporting a noble metal on a catalyst support is well known.

The catalyst may be prepared by mixing the platinum-based catalyst and carbon monoxide oxidizing catalyst supported on a catalyst support, and then heat treating the mixture.

Herein, the platinum-based catalyst and carbon monoxide oxidizing catalyst are mixed in a ratio ranging from about 5 to 0.1:95 to 99.9 wt %. According to one embodiment of the present invention, the platinum-based catalyst and carbon monoxide oxidizing catalyst are mixed in a ratio ranging from about 1 to 0.1:99 to 99.9 wt %.

The heat treatment is performed under a reducing atmosphere at a temperature ranging from about 350 to about 600° C. When the heat treatment is performed at a temperature greater than about 600° C., sintering may occur, preventing production of the desired product. When the heat treatment is performed at a temperature lower than about 350° C., the heat treatment must be sustained for a long time.

The reducing atmosphere is a hydrogen atmosphere. During heat treatment, a reduction reaction occurs, increasing the interaction between the carbon monoxide oxidizing catalyst and the platinum-based catalyst.

According to one embodiment of the present invention, the mixed catalyst at the anode quickly performs a carbon monoxide oxidation reaction (compared to a catalyst including only a platinum-based catalyst), and may prevent poisoning of the platinum-based catalyst by carbon monoxide, which would render the platinum-based catalyst unable to participate in further catalyst reactions. That is, carbon monoxide poisoning may be decreased in the electrode, thereby improving the catalyst activity and the fuel oxidation reaction, and providing a high power fuel cell.

A membrane-electrode assembly including the anode according to one embodiment of the present invention includes a cathode and the above anode, and a polymer electrolyte membrane positioned therebetween.

The cathode includes an electrode substrate and a cathode catalyst layer.

The catalyst of the cathode catalyst layer may be any catalyst that may perform a fuel cell reaction. The catalyst may include a platinum-based catalyst. The platinum-based catalyst may include a material selected from platinum, ruthenium, osmium, platinum-ruthenium alloys, platinum-osmium alloys, platinum-palladium alloys, platinum-M alloys, and combinations thereof. M is a transition element selected from Ga, Ti, V, Cr, Mn, Fe, Co, Ni, Cu, Zn, Sn, Mo, W, Rh, Ru, and combinations thereof. Nonlimiting examples of suitable catalysts include Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, and Pt/Ru/Sn/W.

The metal catalyst may be used by itself (black catalyst), or may be supported on a catalyst support. The catalyst support may include carbon-based materials such as graphite, denka black, ketjen black, acetylene black, carbon nanotubes, carbon nanofiber, carbon nanowire, carbon nanoballs, or activated carbon, or inorganic particulates such as alumina, silica, zirconia, and titania. In one embodiment, for example, carbon-based materials are used. When the catalyst includes a noble metal on a catalyst support, it may include any commercially available catalyst, or may be prepared by supporting a noble metal on a catalyst support. The process for supporting a noble metal on a catalyst support is well known.

The cathode catalyst layer may include a binder resin to improve adherence and proton transfer properties. The binder resin may be a proton conductive polymer resin having a cation exchange group at its side chain selected from sulfonic acid groups, carboxylic acid groups, phosphoric acid groups, phosphonic acid groups, and derivatives thereof. Nonlimiting examples of suitable polymers include proton conductive polymers such as perfluoro-based polymers, benzimidazole-based polymers, polyimide-based polymers, polyetherimide-based polymers, polyphenylenesulfide-based polymers, polysulfone-based polymers, polyethersulfone-based polymers, polyetherketone-based polymers, polyether-etherketone-based polymers, and polyphenylquinoxaline-based polymers. In one embodiment, for example, the proton conductive polymer is selected from poly(perfluorosulfonic acid), poly(perfluorocarboxylic acid), copolymers of tetrafluoroethylene and fluorovinylether having sulfonic acid groups, defluorinated polyetherketone sulfides, aryl ketones, poly(2,2'-(m-phenylene)-5,5'-bibenzimidazole), and poly(2,5-benzimidazole).

The hydrogen (H) in the ion exchange group of the terminal end of the proton conductive polymer side chain may be substituted with Na, K, Li, Cs, or tetrabutylammonium. When the H in the cation exchange group of the terminal end of the proton conductive polymer side chain is substituted with Na or tetrabutylammonium, NaOH or tetrabutylammonium hydroxide, respectively, may be used. When the H is substituted with K, Li, or Cs, suitable compounds for the substitutions may be used. Such substitutions are known in the art.

A single binder resin may be used, or a combination of binder resins may be used. The binder resin may be used along with non-conductive polymers to improve adherence with the polymer electrolyte membrane. The amount of the binder resin may be adjusted according to the desired purpose.

Non-limiting examples of suitable non-conductive polymers include polytetrafluoroethylene (PTFE), tetrafluoroethylene-hexafluoropropylene (FEP) copolymers, tetrafluoroethylene-perfluoro alkyl vinylether (PFA) copolymers, ethylene/tetrafluoroethylene (ETFE) copolymers, chlorotrifluoroethylene-ethylene (ECTFE) copolymers, polyvinylidenefluoride, polyvinylidenefluoride-hexafluoropropylene (PVdF-HFP) copolymers, dodecylbenzenesulfonic acid, sorbitol, and combinations thereof.

The electrode substrate supports the electrode and provides a path for transferring fuel and oxidant to the catalyst layer. In one embodiment, the electrode substrates are formed from materials such as carbon paper, carbon cloth, carbon felt, and metal cloth (i.e. porous films composed of metal fibers, or metal films disposed on surfaces of cloths composed of polymer fibers). However, the electrode substrate is not limited thereto.

The electrode substrate may be treated with a fluorine-based resin to make the substrate water-repellent, which may prevent deterioration of reactant diffusion efficiency due to water generated during fuel cell operation. Nonlimiting examples of suitable fluorine-based resins include polytetrafluoroethylene, polyvinylidene fluoride, polyhexafluoropropylene, polyperfluoroalkylvinylether, polyperfluorosulfonylfluoride alkoxyvinyl ether, fluorinated ethylene propylene, polychlorotrifluoroethylene, and copolymers thereof.

A microporous layer (MPL) may be added between the electrode substrate and catalyst layer to increase reactant diffusion effects. The microporous layer generally includes conductive powders have certain particle diameters. Nonlimiting examples of suitable conductive materials include carbon powder, carbon black, acetylene black, ketjen black, activated carbon, carbon fiber, fullerene, nano-carbon, and combinations thereof. The nano-carbon may include carbon nanotubes, carbon nanofibers, carbon nanowires, carbon nanohorns, carbon nanorings, or combinations thereof.

The microporous layer is formed by coating a composition including a conductive powder, a binder resin, and a solvent on the conductive substrate. Nonlimiting examples of suitable binder resins include polytetrafluoroethylene, polyvinylidenefluoride, polyhexafluoropropylene, polyperfluoroalkylvinylether, polyperfluorosulfonylfluoride, alkoxyvinyl ether, polyvinylalcohol, cellulose acetate, and copolymers thereof. Nonlimiting examples of suitable solvents include alcohols such as ethanol, isopropyl alcohol, n-propyl alcohol, butanol, etc., water, dimethyl acetamide, dimethyl sulfoxide, N-methylpyrrolidone, and tetrahydrofuran. Nonlimiting examples of suitable coating methods include screen printing, spray coating, doctor blade methods, gravure coating, dip coating, silk screening, painting, etc., and the coating method may be selected based on the viscosity of the composition.

The polymer electrolyte membrane of the membrane-electrode assembly may include a proton conductive polymer resin. The proton conductive polymer resin may be a polymer resin having a cation exchange group at its side chain selected from sulfonic acid groups, carboxylic acid groups, phosphoric acid groups, phosphonic acid groups, and derivatives thereof.

Nonlimiting examples of suitable polymer resins include fluoro-based polymers, benzimidazole-based polymers, polyimide-based polymers, polyetherimide-based polymers, polyphenylenesulfide-based polymers, polysulfone-based polymers, polyethersulfone-based polymers, polyetherketone-based polymers, polyether-etherketone-based polymers, polyphenylquinoxaline-based polymers, and combinations thereof. In one embodiment, the proton conductive polymer is selected from poly(perfluorosulfonic acid) (NAFION®), poly(perfluorocarboxylic acid), copolymers of tetrafluoroethylene and fluorovinylether having sulfonic acid groups, defluorinated polyetherketone sulfides, aryl ketones, poly(2,2'-(m-phenylene)-5,5'-bibenzimidazole), and poly(2, 5-benzimidazole).

The hydrogen (H) in the proton conductive group of the proton conductive polymer may be substituted with Na, K, Li, Cs, or tetrabutylammonium. When the H in the ion exchange group of the terminal end of the proton conductive polymer side chain is substituted with Na or tetrabutylammonium, NaOH or tetrabutylammonium hydroxide, respectively, may be used. When the H is substituted with K, Li, or Cs, suitable compounds for the substitutions may be used. Such substitutions are known in the art.

According to another embodiment of the present invention, a fuel cell system includes at least one electricity generator, a fuel supplier, and an oxidant supplier. The electricity generator includes a membrane-electrode assembly including the above anode and a separator. The electricity generator generates electricity through oxidation of the fuel and reduction of the oxidant. The fuel supplier supplies the fuel to the electricity generator. The oxidant supplier supplies the oxidant (such as oxygen or air) to the electricity generator.

The fuel includes liquid or gaseous hydrogen, or a hydrocarbon-based fuel such as methanol, ethanol, propanol, butanol, or natural gas.

FIG. 1 illustrates one exemplary fuel cell system in which a fuel and an oxidant are provided to the electricity generator through pumps. The present invention is not limited to such structures. The fuel cell system of the present invention may alternatively include a structure in which a fuel and an oxidant are provided by diffusion.

Referring to FIG. 1, a fuel cell system 1 includes at least one electricity generator 3 that generates electrical energy through an electrochemical reaction of a fuel and an oxidant, a fuel supplier 5 for supplying a fuel to the electricity generator 3, and an oxidant supplier 7 for supplying an oxidant to the electricity generator 3.

In addition, the fuel supplier 5 is equipped with a tank 9 that stores fuel, and is connected to a fuel pump 11. The fuel pump 11 supplies fuel stored in the tank 9 according to the pumping power of the pump.

The oxidant supplier 7, which supplies the oxidant to the electricity generator 3, is equipped with at least one pump 13 for supplying the oxidant according to the pumping power of the pump.

The electricity generator 3 includes a membrane-electrode assembly 17 that oxidizes hydrogen (or other fuel) and reduces the oxidant. The electricity generator 3 also includes separators 19 and 19' at opposite sides of the membrane-electrode assembly for supplying hydrogen (or other fuel) and the oxidant. At least one electricity generator 3 is used to make a stack 15.

The following Examples illustrate certain embodiments of the present invention. However, these Examples are presented for illustrative purposes only and are not intended to limit the scope of the present invention.

Example 1

An anode catalyst was prepared by mixing a Pt—Ru black catalyst (Johnson Matthey, HiSpec 6000) and a Au carbon monoxide oxidizing catalyst on a $ThO_2$ catalyst support. 88 wt % of the anode catalyst was mixed with 12 wt % of a NAFION/H$_2$O/2-propanol (Solution Technology Inc.) binder in a concentration of 5 wt % to prepare an anode catalyst composition.

The anode catalyst was prepared by mixing 99.5 wt % of a Pt—Ru black catalyst (Johnson Matthey, HiSpec 6000) and 0.5 wt % of a Au carbon monoxide oxidizing catalyst on a TiO$_2$ catalyst support, and thereafter, heat-treating the mixture under a H$_2$ atmosphere at 300° C. The carbon monoxide oxidizing catalyst had an average particle diameter of 100 nm including the TiO$_2$ support and an average particle diameter of 10 nm excluding the TiO$_2$ support. The loading amount of Au in the carbon monoxide oxidizing catalyst was 0.1 wt %.

The anode catalyst composition was coated on carbon paper, thereby preparing an anode.

Next, a cathode catalyst composition was prepared by mixing 88 wt % of a Pt black cathode catalyst (Johnson Matthey, HiSpec 100) and 12 wt % of a NAFION/H$_2$O/2-propanol (Solution Technology Inc.) binder in a concentration of 5 wt %.

The cathode catalyst composition was coated on carbon paper to prepare a cathode.

The anode and the cathode, as well as a commercially-available Nafion 115 (perfluorosulfonic acid) polymer electrolyte membrane, were used to prepare a membrane-electrode assembly.

A unit cell for a fuel cell was prepared by positioning the membrane-electrode assembly between two gaskets, then between two separators having gas flow channels and cooling channels, and then compressed between copper end plates.

Example 2

A unit cell was fabricated as in Example 1, except that the loading amount of Au in the carbon monoxide oxidizing catalyst was 0.5 wt %.

Example 3

A unit cell was fabricated as in Example 1, except that the loading amount of Au in the carbon monoxide oxidizing catalyst was 1 wt %.

Example 4

A unit cell was fabricated as in Example 1, except that the loading amount of Au in the carbon monoxide oxidizing catalyst was 2 wt %.

Example 5

A unit cell was fabricated as in Example 1, except that the loading amount of Au in the carbon monoxide oxidizing catalyst was 3 wt %.

Example 6

A unit cell was fabricated as in Example 1, except that the loading amount of Au in the carbon monoxide oxidizing catalyst was 4 wt %.

Example 7

A unit cell was fabricated as in Example 1, except that the loading amount of Au in the carbon monoxide oxidizing catalyst was 5 wt %.

Reference Example 1

A unit cell was fabricated as in Example 1, except that the loading amount of Au in the carbon monoxide oxidizing catalyst was 0.05 wt %.

Reference Example 2

A unit cell was fabricated as in Example 1, except that the loading amount of Au in the carbon monoxide oxidizing catalyst was 11 wt %.

Comparative Example 1

A Pt—Ru black anode catalyst (Johnson Matthey, HiSpec 6000) was mixed with a 5 wt %-Nafion/H$_2$O/2-propanol binder (Solution Technology Inc.) in a weight ratio of 88 wt %:12 wt % to prepare an anode catalyst composition.

Further, a Pt black cathode catalyst (Johnson Matthey, HiSpec 100) was mixed with a 5 wt %-Nafion/H$_2$O/2-propanol binder (Solution Technology Inc.) in a weight ratio of 88 wt %:12 wt % to prepare a cathode catalyst composition.

The anode and cathode catalyst compositions were each coated on carbon paper to prepare an anode and a cathode.

Then, the prepared anode and cathode and a commercially-available Nafion 115 (perfluorosulfonic acid) polymer electrolyte membrane were used to fabricate a membrane-electrode assembly.

The membrane-electrode assembly for a fuel cell was inserted between two sheets of gaskets, then between two separators having gas channels and cooling channels, and then compressed between copper end plates, thereby fabricating a unit cell.

Power densities of the unit cells fabricated according to Examples 1 to 5, Reference Examples 1 and 2, and Comparative Example 1 at 0.35V, 0.4V, and 0.45V were measured at 70° C. and the results are shown in Table 1.

TABLE 1

| | Loading amount of Au in the carbon monoxide oxidizing catalyst (Au/TiO$_2$), wt % | 70° C., mW/cm$^2$ | | |
|---|---|---|---|---|
| | | 0.45 V | 0.4 V | 0.35 V |
| Example 1 | 0.1 | 85 | 112 | 132 |
| Example 2 | 0.5 | 85 | 113 | 132 |
| Example 3 | 1 | 90 | 125 | 145 |
| Example 4 | 2 | 95 | 128 | 154 |
| Example 5 | 3 | 98 | 135 | 165 |
| Example 6 | 4 | 86 | 115 | 145 |
| Example 7 | 5 | 85 | 113 | 132 |
| Reference Example 1 | 0.05 | 84 | 110 | 128 |
| Reference Example 2 | 11 | 82 | 110 | 131 |
| Comparative Example 1 | 0 | 85 | 112 | 131 |

As shown in Table 1, the cells including electrodes prepared according to Examples 1 to 7 (having loading amounts of Au in the carbon monoxide oxidizing catalyst of 0.1 to 5 wt %) showed improved power densities compared to the cell prepared according to Comparative Example 1 (without the carbon monoxide oxidizing catalyst). Further, the cell prepared according to Reference Example 1 (in which the loading amount of Au was 0.05 wt %) and the cell prepared according to Reference Example 2 (in which the loading amount of Au was 11 wt %) showed rather lower power densities than the cells prepared according to Comparative Example 1.

Example 8

A unit cell was fabricated as in Example 1, except that Au was loaded in an amount of 2 wt % based on the weight of the carbon monoxide oxidizing catalyst (as in Example 3), and then 0.1 wt % of the obtained carbon monoxide oxidizing catalyst was mixed with 99.9 wt % of the Pt—Ru black anode catalyst (Johnson Matthey, HiSpec 6000).

Example 9

A unit cell was fabricated as in Example 8, except that 0.2 wt % of the obtained carbon monoxide oxidizing catalyst was mixed with 99.8 wt % of the Pt—Ru black anode catalyst (Johnson Matthey, HiSpec 6000).

Example 10

A unit cell was fabricated as in Example 8, except that 0.4 wt % of the obtained carbon monoxide oxidizing catalyst was mixed with 99.6 wt % of the Pt—Ru black anode catalyst (Johnson Matthey, HiSpec 6000).

Example 11

A unit cell was fabricated as in Example 8, except that 0.5 wt % of the obtained carbon monoxide oxidizing catalyst was mixed with 99.5 wt % of the Pt—Ru black anode catalyst (Johnson Matthey, HiSpec 6000).

Example 12

A unit cell was fabricated as in Example 8, except that 0.6 wt % of the obtained carbon monoxide oxidizing catalyst was mixed with 99.4 wt % of the Pt—Ru black anode catalyst (Johnson Matthey, HiSpec 6000).

Example 13

A unit cell was fabricated as in Example 8, except that 0.8 wt % of the obtained carbon monoxide oxidizing catalyst was mixed with 99.2 wt % of the Pt—Ru black anode catalyst (Johnson Matthey, HiSpec 6000).

Example 14

A unit cell was fabricated as in Example 8, except that 1 wt % of the obtained carbon monoxide oxidizing catalyst was mixed with 99 wt % of the Pt—Ru black anode catalyst (Johnson Matthey, HiSpec 6000).

Reference Example 3

A unit cell was fabricated as in Example 8, except that 0.05 wt % of the obtained carbon monoxide oxidizing catalyst was mixed with 99.95 wt % of the Pt—Ru black anode catalyst (Johnson Matthey, HiSpec 6000).

Reference Example 4

A unit cell was fabricated as in Example 8, except that 6 wt % of the obtained carbon monoxide oxidizing catalyst was mixed with 94 wt % of the Pt—Ru black anode catalyst (Johnson Matthey, HiSpec 6000).

Power densities of the unit cells fabricated according to Examples 8 to 14, and Reference Examples 3 and 4 at 0.35V, 0.4V, and 0.45V were measured at 70° C. and the results are shown in Table 2. For comparison, the measurement results of Comparative Example 1 are also given.

TABLE 2

| | Amount of carbon monoxide oxidizing catalyst, wt % | 70° C., mW/cm$^2$ | | |
|---|---|---|---|---|
| | | 0.45 V | 0.4 V | 0.35 V |
| Example 8 | 0.1 | 85 | 112 | 132 |
| Example 9 | 0.2 | 88 | 115 | 131 |
| Example 10 | 0.4 | 95 | 130 | 154 |
| Example 11 | 0.5 | 96 | 135 | 161 |
| Example 12 | 0.6 | 96 | 134 | 159 |
| Example 13 | 0.8 | 90 | 120 | 133 |
| Example 14 | 1 | 86 | 112 | 131 |
| Reference Example 3 | 0.05 | 85 | 112 | 128 |
| Reference Example 4 | 6 | 81 | 111 | 129 |
| Comparative Example 1 | 0 | 85 | 112 | 131 |

As shown in Table 2, the cells including the electrodes prepared according to Examples 8 to 14 (in which 0.1 to 1 wt % of the carbon monoxide oxidizing catalyst was used) showed improved power densities compared to the cells including electrodes prepared according to Comparative Example 1 (without the carbon monoxide oxidizing catalyst). Further, the cell prepared according to Reference Example 3 (in which the carbon monoxide oxidizing catalyst was added in a small amount of 0.05 wt %) and the cell prepared according to Reference Example 4 (in which the carbon monoxide oxidizing catalyst was added in an excess amount of 6 wt %) showed rather lower power densities than the cell prepared according to Comparative Example 1.

As described above, an anode for a fuel cell according to the present invention includes a carbon monoxide oxidizing catalyst, thereby increasing carbon monoxide oxidation. Accordingly, fuel cells including such anodes have high activity. In addition, fuel oxidation is improved, thereby providing fuel cells with high power.

While the present invention has been illustrated and described with reference to certain exemplary embodiments, it will be understood by those of ordinary skill in the art that various changes and modifications may be made to the described embodiments without departing from the spirit and scope of the present invention as defined by the following claims.

What is claimed is:

1. An anode for a fuel cell, comprising:
   a catalyst layer comprising a platinum-based metal catalyst and a carbon monoxide oxidizing catalyst on a catalyst support; and
   an electrode substrate supporting the catalyst layer,
   wherein the catalyst support comprises $TiO_2$, wherein the platinum-based catalyst and carbon monoxide oxidizing catalyst on the catalyst support are present at a ratio ranging from about 99 to 99.9:1 to 0.1 wt %, and wherein the carbon monoxide oxidizing catalyst is present on the catalyst support in an amount ranging from about 1 to about 3 wt %.

2. The anode of claim 1, wherein the catalyst layer is prepared by a method comprising:

mixing the carbon monoxide oxidizing catalyst on the catalyst support and the platinum-based catalyst to form a mixture; and subjecting the mixture to heat-treatment.

3. The anode of claim 2, wherein the heat treatment is performed under a reducing atmosphere at a temperature ranging from about 350 to about 600° C.

4. The anode of claim 1, wherein the carbon monoxide oxidizing catalyst comprises a material selected from the group consisting of Au, Pt—Co alloys, and combinations thereof.

5. The anode of claim 1, wherein the carbon monoxide oxidizing catalyst on the catalyst support has an average particle diameter ranging from about 20 to about 500 nm.

6. The anode of claim 1, wherein the platinum-based catalyst is selected from the group consisting of platinum, ruthenium, osmium, platinum-ruthenium alloys, platinum-osmium alloys, platinum-palladium alloys, platinum-M alloys, and combinations thereof, wherein M is a transition element selected from the group consisting of Ga, Ti, V, Cr, Mn, Fe, Co, Ni, Cu, Zn, Sn, Mo, W, Rh, Ru, and combinations thereof.

7. The anode of claim 1, wherein the platinum-based catalyst is supported on a second catalyst support.

8. A membrane-electrode assembly for a fuel cell, comprising:
the anode of claim 1;
a cathode; and
a polymer electrolyte membrane between the anode and cathode.

9. The membrane-electrode assembly of claim 8, wherein the catalyst layer is prepared by a method comprising:
mixing a carbon monoxide oxidizing catalyst supported on a catalyst support and a platinum-based catalyst to form a mixture; and
subjecting the mixture to heat-treatment.

10. The membrane-electrode assembly of claim 8, wherein the carbon monoxide oxidizing catalyst comprises a material selected from the group consisting of Au, Pt—Co alloys, and combinations thereof.

11. The membrane-electrode assembly of claim 8, wherein the carbon monoxide oxidizing catalyst on the catalyst support has an average particle diameter ranging from about 20 to 500 nm.

12. The membrane-electrode assembly of claim 8, wherein the platinum-based catalyst is selected from the group consisting of platinum, ruthenium, osmium, platinum-ruthenium alloys, platinum-osmium alloys, platinum-palladium alloys, platinum-M alloys, and combinations thereof, wherein M is a transition element selected from the group consisting of Ga, Ti, V, Cr, Mn, Fe, Co, Ni, Cu, Zn, Sn, Mo, W, Rh, Ru, and combinations thereof.

13. The membrane-electrode assembly of claim 8, wherein the platinum-based catalyst is supported on a second catalyst support.

14. A fuel cell system comprising:
an electricity generator comprising a membrane-electrode assembly comprising:
the anode of claim 1,
a cathode,
a polymer electrolyte membrane between the anode and cathode, and
a separator, wherein the electricity generator generates electricity through reduction of an oxidant and oxidation of a fuel;
a fuel supplier for supplying the fuel to the electricity generator; and
an oxidant supplier for supplying the oxidant to the electricity generator.

15. The fuel cell system of claim 14, wherein the catalyst layer is prepared by mixing the carbon monoxide oxidizing catalyst on the catalyst support and the platinum-based catalyst to form a mixture, and then heat-treating the mixture.

16. The fuel cell system of claim 14, wherein the carbon monoxide oxidizing catalyst is selected from the group consisting of Au, Pt—Co alloys, and combinations thereof.

17. The fuel cell system of claim 14, wherein the carbon monoxide oxidizing catalyst on the catalyst support has an average particle diameter ranging from about 20 to about 500 nm.

18. The fuel cell system of claim 14, wherein the platinum-based catalyst is selected from the group consisting of platinum, ruthenium, osmium, platinum-ruthenium alloys, platinum-osmium alloys, platinum-palladium alloys, platinum-M alloys, and combinations thereof, wherein M is a transition element selected from the group consisting of Ga, Ti, V, Cr, Mn, Fe, Co, Ni, Cu, Zn, Sn, Mo, W, Rh, Ru, and combinations thereof.

19. The fuel cell system of claim 14, wherein the platinum-based catalyst is supported on a second catalyst support.

* * * * *